Patented Feb. 18, 1930

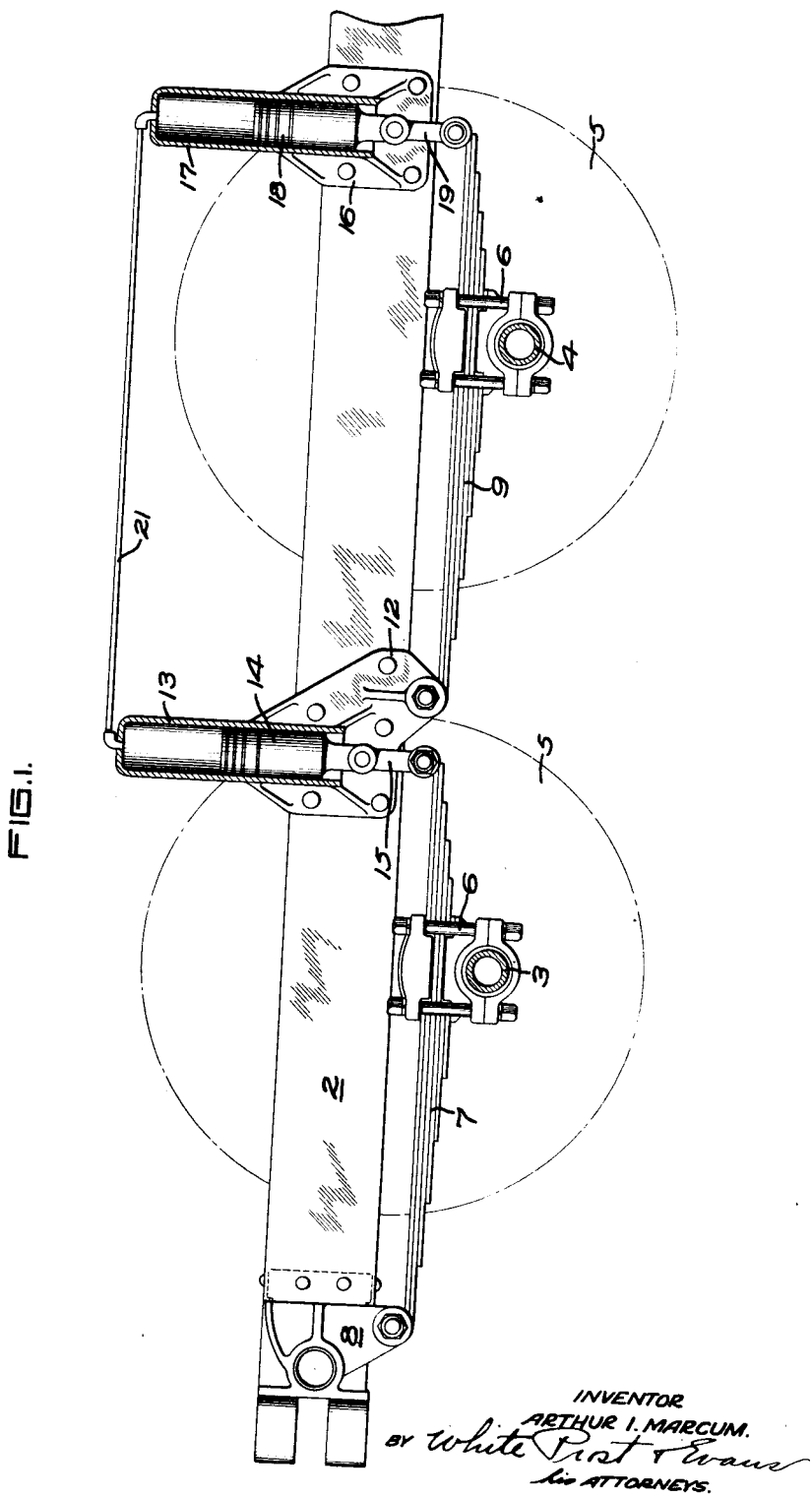

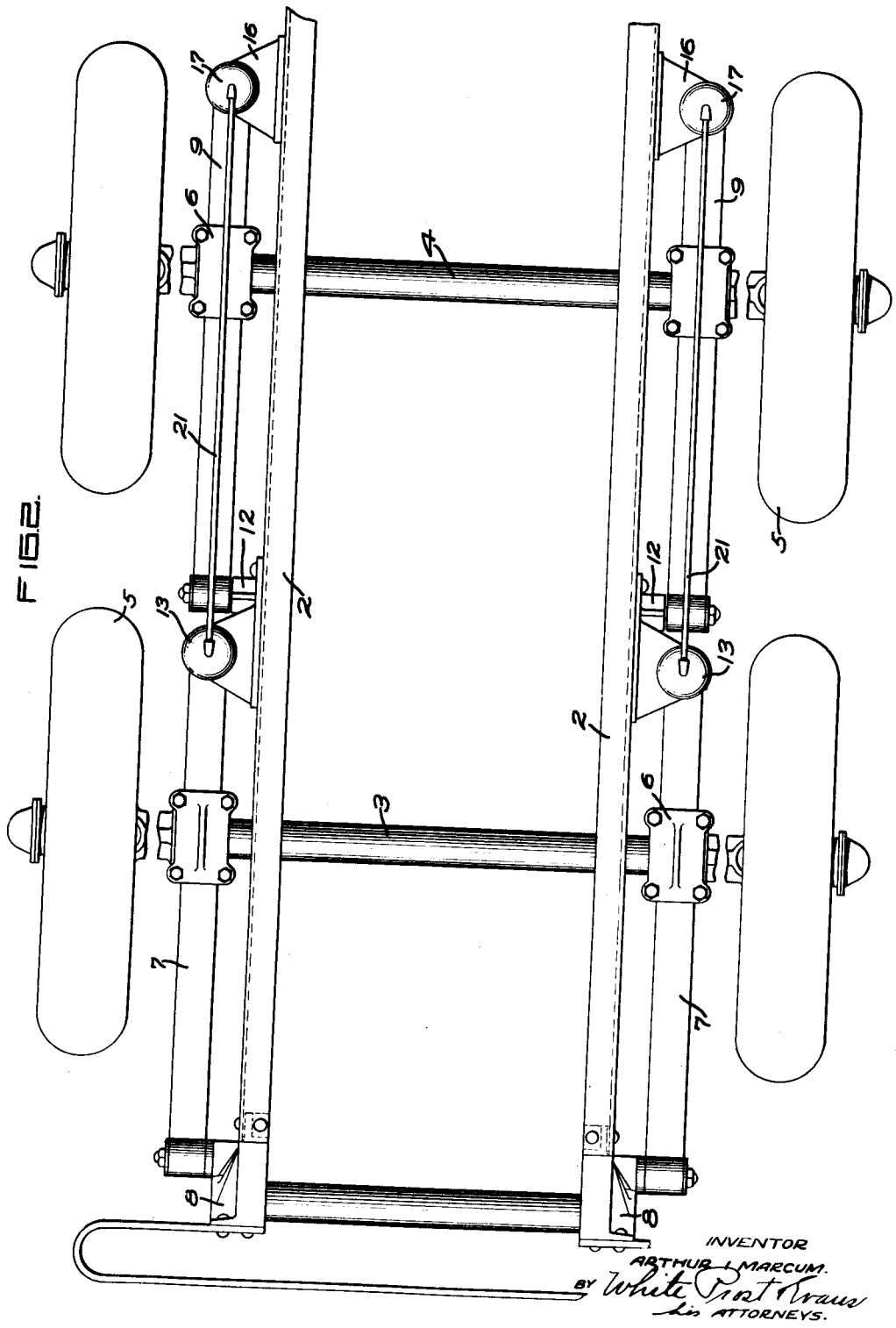

1,747,902

UNITED STATES PATENT OFFICE

ARTHUR I. MARCUM, OF OAKLAND, CALIFORNIA, ASSIGNOR TO EMORY WINSHIP, OF SAN FRANCISCO, CALIFORNIA

SPRING SUSPENSION FOR VEHICLES

Application filed June 12, 1924. Serial No. 719,492.

The invention relates to a spring suspension for vehicles and particularly for road vehicles having tandem axles, that is, two axles arranged in a pair.

An object of the invention is to provide a spring suspension for tandem axle vehicles which will minimize the shock transferred to the vehicle frame.

Another object of the invention is to provide a spring suspension for use in connection with tandem axles in which flexure of the springs will not vary the distance between the axles.

A further object of the invention is to provide a spring suspension for use in connection with tandem axles in which the shock produced at either axle is transmitted through the entire spring suspension.

The invention possesses other advantageous features, some of which with the foregoing, will be set forth at length in the following description, where I shall outline in full that form of my invention which I have selected for illustration in the drawings accompanying and forming part of the present specification. In said drawings I have shown one form of my invention, but it is to be understood that I do not limit myself to such form since the invention, as set forth in the claims, may be embodied in a plurality of forms.

Referring to said drawings:

Figure 1 is a vertical longitudinal section through a portion of a vehicle having tandem axles, showing the spring suspension associated with the axles.

Figure 2 is a top or plan view of the portion of the vehicle shown in Figure 1, showing the spring suspension on both sides of the vehicle frame.

The spring suspension of my invention is particularly adapted to be used in connection with road vehicles having tandem axles, that is, six or eight wheeled vehicles. The spring suspension is constructed to minimize the shock transferred to the vehicle frame from the axles and the springs secured to the separate axles are connected together in such manner that the shock or displacement produced at one axle is absorbed or equalized throughout the entire spring suspension, so that the shock transferred to the vehicle frame is minimized.

In the drawings I have shown a portion of a vehicle frame 2 together with the two axles 3 and 4 of the tandem axles. Each axle is provided on each end with a ground engaging wheel 5 and a spring suspension unit is arranged at each side of the vehicle frame. In Figure 1 I have shown the spring suspension unit on one side of the frame and it is to be understood that an identical unit is arranged on the other side of the frame. Secured intermediate its ends to the front axle 3 by a suitable clamp 6 is a substantially flat leaf spring 7 which is pivoted at its forward end to the bracket 8, which is secured to the vehicle frame. The axle 3 is secured to the spring 7 intermediate the ends of the spring and preferably closer to the rear end of the spring than to the front end of the spring.

A similar leaf spring 9 is secured to the rear axle 4 by a suitable clamp 6, the axle being disposed nearer the rear end of the spring than the front end and the front end is pivoted to a bracket 12 secured to the vehicle frame. The bracket 8 and the bracket 12 are of such dimensions that the front ends of the two springs lie in the same horizontal plane. The rear ends of the two springs also lie in the same horizontal plane in which the front ends of the springs lie, so that when the vehicle is normally loaded, both ends of both springs lie in the same horizontal plane. The springs are shown in Figure 1 in the positions that they will assume when the vehicle is normally loaded.

Secured to or formed integral with the bracket 12 is a closed top cylinder or air bottle 13, which is preferably vertically disposed and which lies substantially directly above the rear end of the front spring 7. Disposed in the cylinder 13 and forming a tight sliding joint therein is a piston 14 which is secured to the rear end of the spring 7 by the link 15. Secured to the vehicle frame adjacent the rear end of the spring 9 is a bracket 16. Secured to or formed integrally with the bracket 16 is a vertically disposed closed top cylinder or air bottle 17, in which there is disposed a piston 18 which is connected to the rear end of the rear spring by the link 19. The cylinders 13 and 17 are connected together above the pistons by a pipe or conduit 21 whereby the air pressure in the two cylinders is equalized. The imprisoned air forms a spring or cushion which acts to absorb the shocks which are transmitted to it by the springs 7 or 9 and, when the shock is too great for absorption, transfers the shock by reason of the connection 21, to the other spring, so that a large shock is distributed throughout the whole spring suspension. A small shock may be absorbed by the springs 7 or 9 independently or by the air cushions independently or by a combination of the leaf springs and the air springs. A large shock, however, is transmitted through the entire spring suspension, thus minimizing the shock transmitted to the vehicle frame. The springs 7 and 9 are substantially flat at normal load so that flexure of the springs does not materially vary the distance between the axles 3 and 4. There is thus provided a spring suspension which maintains the axles in proper position and which acts with maximum efficiency to absorb and distribute road shocks.

I claim:

1. The combination with a vehicle frame of a pair of spaced axles arranged at one end of the frame, a leaf spring secured to each axle at each side of the frame, the springs being pivotally connected to the frame at their forward ends, cylinders secured to the frame and disposed above the rear ends of the springs, pistons in said cylinders, links connecting the pistons to the rear ends of the springs and a conduit connecting the cylinders above the pistons at the same side of the vehicle.

2. The combination with a vehicle frame of a pair of spaced axles arranged at one end of the frame, a leaf spring secured to each axle at each side of the frame, the springs being pivotally connected to the frame at their forward ends, vertically disposed closed top cylinders secured to the frame and arranged above the rear ends of the springs, pistons in said cylinders, links connecting the rear ends of the springs with the pistons in the associated cylinders and conduits connecting the two cylinders on each side of the frame together above the pistons, the conduits at one side of the frame being unconnected with the conduits at the other side thereof.

3. The combination with a vehicle frame, of a pair of spaced axles arranged at one end of the frame, a substantially flat leaf spring secured intermediate its ends to each axle at each side of the frame, brackets secured to the front end of the frame to which the forward ends of the front springs are pivotally connected, brackets secured to the frame intermediate the axles to which the forward ends of the rear springs are pivotally connected, a vertically disposed closed top cylinder secured to each of the latter brackets, pistons in said cylinders, links connecting the rear ends of the front springs to said pistons, a vertically disposed closed top cylinder secured at each side of the frame above the rear ends of the rear springs, pistons in said latter cylinders, links connecting the rear ends of the rear springs to the associated pistons and conduits connecting the two cylinders on each side of the frame together above the pistons, the conduits at one side of the frame being unconnected with the conduits at the other side thereof.

4. A vehicle comprising a frame; a pair of springs secured to said frame at longitudinally spaced points at one end of said frame; an axle secured to each spring, and independent pneumatic shock absorbing and transmitting means arranged at each side of the frame interconnecting said springs and said frame at points longitudinally spaced from said first mentioned points.

5. A vehicle comprising a frame; a pair of flat leaf springs with one end of each spring secured to said frame at longitudinally spaced points at one end of said frame; a pair of substantially parallel axles supporting said springs; and independent pneumatic means interconnecting the other ends of said springs to each other and to said frame at each side thereof in a manner to transmit shocks at each of said axles to the other of said axles through said springs.

6. A vehicle including a frame, a plurality of tandem axles arranged adjacent one end of said frame, springs attached to each axle and to the frame at each side thereof; and independent pneumatic shock absorbing and transmitting means at each side of the frame; said means being operated by said springs and serving to couple said springs to the frame and operatively to each other and to transmit a portion of the shock from the spring of one axle to the adjacent spring of the other axle.

7. A vehicle including a frame, tandem axles supporting one end of said frame, a pair of springs to connect each axle to the frame, each spring being pivoted to the frame at one end and connected to the axle between its ends and shock absorbing means at each side of the frame for transmitting unusual shocks to a spring individual to one axle to the spring that is individual to the other axle at the same side of the vehicle, said last named means including pistons secured to the other end of each of said springs and movably mounted in cylinders surrounding said pistons and carried by the frame, adjacent cylinders on each side of the vehicle being connected together by a conduit, but being independent of the cylinders on the other side of the frame.

8. A vehicle including a frame, tandem axles supporting one end of said frame, a pair of springs secured to each axle and pivoted at one end to said frame so that the axles are capable of substantial swinging movement about the pivotal connections between said springs and frame, a pair of closed cylinders at each side of said frame, means connecting the cylinders on the same side of the vehicle together independently of those on the other side thereof, and pistons in said cylinders each of said pistons being connected to one of said springs, whereby substantial shocks through each spring are absorbed in part by said spring in part within said cylinder and in part transmitted to the adjacent spring on the same side of the vehicle and whereby the swinging movement of the axles permitted by their pivotal connection to the frame, is resiliently cushioned in said cylinder and by said springs.

9. A vehicle running gear including a frame, a pair of wheels, a second pair of wheels, one wheel of said pairs of wheels being disposed on the same side of said frame to the rear thereof, means pivotally secured at one end to the frame, means for operatively connecting said means with said wheels, and hydraulic equalizing means on the same side of said frame.

In testimony whereof, I have hereunto set my hand.

ARTHUR I. MARCUM.